(12) United States Patent
Evans et al.

(10) Patent No.: US 9,228,444 B2
(45) Date of Patent: Jan. 5, 2016

(54) ANNULUS FILLER

(71) Applicant: ROLLS-ROYCE PLC, London (GB)

(72) Inventors: Dale Edward Evans, Derby (GB); Ian Colin Deuchar Care, Derby (GB)

(73) Assignee: ROLLS-ROYCE plc, London (GB)

(*) Notice: Subject to any disclaimer, the term of this patent is extended or adjusted under 35 U.S.C. 154(b) by 806 days.

(21) Appl. No.: 13/666,613

(22) Filed: Nov. 1, 2012

(65) Prior Publication Data

US 2013/0266447 A1 Oct. 10, 2013

(30) Foreign Application Priority Data

Nov. 15, 2011 (GB) ................... 1119655.7

(51) Int. Cl.
*F01D 5/22* (2006.01)
*F01D 5/30* (2006.01)
*F02K 3/06* (2006.01)
*F01D 11/00* (2006.01)

(52) U.S. Cl.
CPC .............. *F01D 5/225* (2013.01); *F01D 5/30* (2013.01); *F01D 5/3007* (2013.01); *F01D 11/008* (2013.01); *F02K 3/06* (2013.01)

(58) Field of Classification Search
None
See application file for complete search history.

(56) References Cited

U.S. PATENT DOCUMENTS

| | | | |
|---|---|---|---|
| 3,294,364 A * | 12/1966 | Stanley | 416/219 R |
| 3,712,757 A * | 1/1973 | Goodwin | 416/245 R |
| 3,801,222 A | 4/1974 | Violette | |
| 4,655,687 A | 4/1987 | Atkinson | |
| 4,802,824 A | 2/1989 | Gastebois et al. | |
| 5,277,548 A * | 1/1994 | Klein et al. | 416/193 A |
| 5,368,444 A | 11/1994 | Anderson | |
| 5,464,326 A | 11/1995 | Knott | |
| 5,890,874 A | 4/1999 | Lambert et al. | |
| 6,132,175 A | 10/2000 | Cai et al. | |
| 6,217,283 B1 | 4/2001 | Ravenhall et al. | |
| 6,312,224 B1 | 11/2001 | Knott et al. | |
| 6,514,045 B1 | 2/2003 | Barton et al. | |
| 6,832,896 B1 | 12/2004 | Goga et al. | |
| 7,942,636 B2 | 5/2011 | Evans | |
| 2002/0044870 A1 | 4/2002 | Simonetti et al. | |
| 2008/0159866 A1* | 7/2008 | Evans | 416/193 A |

(Continued)

FOREIGN PATENT DOCUMENTS

| | | |
|---|---|---|
| EP | 0 787 890 A3 | 4/1999 |
| EP | 1 067 274 A1 | 1/2001 |
| EP | 2 267 277 A2 | 12/2010 |

(Continued)

OTHER PUBLICATIONS

Feb. 20, 2012 Search Report issued in British Patent Application No. GB1119655.7.

*Primary Examiner* — Christopher Verdier
*Assistant Examiner* — Justin Seabe
(74) *Attorney, Agent, or Firm* — Oliff PLC

(57) ABSTRACT

A rotor assembly for a gas turbine engine, the rotor assembly has a disc supporting a plurality of radially extending blades. The blades define passages therebetween and each passage has an annulus filler assembly. The annulus filler assembly includes at least two bodies and a brace, each of the bodies being arranged to abut respective adjacent blades and the brace is arranged to occupy a position centrally of the two bodies. The brace is mounted to the disc and each body and the brace are arranged to engage one another to form an airwash surface. The airwash surface improves aerodynamic flow of air entering the gas turbine engine.

15 Claims, 8 Drawing Sheets

(56) References Cited

U.S. PATENT DOCUMENTS

2009/0269203 A1  10/2009  Care et al.
2010/0040472 A1  2/2010   Read et al.
2010/0074731 A1* 3/2010   Wiebe et al. ............... 415/173.4
2011/0243709 A1* 10/2011  El-Aini et al. .................... 415/1

FOREIGN PATENT DOCUMENTS

| GB | 750397      | 6/1956  |
| GB | 2 186 639 A | 8/1987  |
| GB | 2 420 162 A | 5/2006  |
| WO | WO 93/22539 | 11/1993 |

* cited by examiner

ANNULUS FILLER

The present invention relates to bladed rotors for an aeroengine. In particular, the invention relates to annulus fillers located between adjacent blades of a bladed rotor which may be a compressor, fan or propeller stage of a gas turbine engine.

Conventionally the compressor, fan or propeller stage of a gas turbine engine comprises a plurality of radial extending blades mounted on a rotor disc. The passages between adjacent blades require a smooth surface forming the radially inner wall of the fan annulus to ensure the clean flow of air through the stage during engine operation. It is not preferable for the blades or the rotor disc to accommodate this air washed surface and usually an annulus filler is provided to bridge the annulus gap between adjacent blades.

A weight-efficient solution, annulus fillers are generally constructed in the form of thin-walled sections mounted onto the rotor disc. As a rotating component, a lighter weight annulus filler will have lower internal forces during engine operation and also reduce forces transmitted to the rotor disc. Additionally, a smaller component mass is of benefit in reducing the overall weight of the engine and contributing to improved engine efficiency. A smaller annulus filler must still meet operational demands of being secure under normal and gust wind loads and the reverse air flow experienced during engine surge.

A number of methods exist to mount the annulus filler to the rotor disc and, in some cases, to the blade. The annulus filler may be provided with hooks, pins or trunnions which engage with the rotor disc. Another method is to provide a foot on the annulus filler which engages with a complementary groove on the rotor disc. Alternately, the filler may be simply held in place by bolts or adhesive. The annulus filler fits snugly against the blade and to form a complete air washed surface may include compliant seals against the blade and any axial retaining components. As these seals can fail in service this necessitates the easy removal and replacement of the annulus filler.

These methods of fixation have the advantage of allowing the annulus filler to be removed and replaced independently of the blades; however, although the engagement features match the curvature of the blades during assembly, the blades can twist and move in normal use meaning the blade to annulus filler seal must accommodate some variation in shape and some movement. The engagement features may be prone to wear and corrosion, which is commonly termed fretting fatigue and caused by friction and heat cycling of the components. This can reduce the life of the rotor disc and necessitate regular inspection during the lifetime of the fan assembly. Furthermore, requiring dedicated features on the rotor disc gives rise to additional design and manufacturing considerations to control stress in the component.

During engine operation the circumferential distance of the annulus gap may vary due to vibrations, twisting of blades and relative movement between adjacent blades. In the extreme, the annulus filler may be subject to forces and relative movement between blades caused by an object striking the fan stage. In a rare occurrence known as a 'blade-off' event, a blade may detach from the rotor disc. In meeting these operational demands an annulus filler, designed and usually constructed from an aluminium alloy or a composite material (fibre reinforced resin), has an impact on the design of other components in the engine.

The mass and physical size of the annulus filler has an impact on the size and weight of the containment casing for the engine, particularly in the region aft (downstream) of the fan wash line. The engine must be designed to contain debris released during an impact on the engine or a blade-off event; therefore, any reduction in weight of the annulus filler, or fragment thereof when released, may have an efficiency benefit by improving the design of the containment casing. This may be particularly important to consider for fan stages where there are fewer, but larger, blades, including composite blades. In this instance there will be a larger annulus gap requiring a correspondingly larger and stiffer annulus filler, which will therefore imply a larger mass. This larger mass will drive a correlated increase in the containment casing and has a negative impact on efficiency.

Where composite blades have been selected for use, neighbouring blades may be compromised during a 'blade-off' event by the use of a metallic alloy annulus filler. Although it may be preferable to use a frangible composite annulus filler in these circumstances, which may be less likely to damage the blades, this gives rise to an issue with corrosion at the interface between the annulus filler and the supporting rotor disc or other metallic components. Any parts that break up may be ingested by the core of the engine and these should not adversely affect engine operation.

It is an object of the invention to seek to provide an annulus filler that mitigates the disadvantages set out above.

According to an aspect of the invention there is provided a rotor assembly for a gas turbine engine according to claim 1.

According to an aspect of the invention there is provided a rotor assembly for a gas turbine engine according to claim 5.

Advantageously, the annulus filler is lightweight while remaining stiff enough to for a good aerodynamic airwash surface. Beneficially, the structure is able to absorb a degree of relative movement between the blades and in the event of extreme blade movement causing damage to the annulus filler only a portion of its structure may be released resulting in low energy debris passing downstream through the engine.

The rotor assembly may have any one of or, to the extent that they are compatible, any combination of the optional features herein.

The rotor assembly may further comprise engagement of the brace with at least one body forming an unlinked and moveable seal. The seal ensures a continuous aerodynamic surface making up the airwash surface.

The seal may further comprise a lip arranged to overlap a co-operating feature.

The lip may overlap the feature in direction radially outward of the disc.

The feature may comprise a radially outer opposing wall and a radially inner opposing wall to define a slot and the lip is located centrally therebetween. Locating the lip between a slot provides extra stiffness and structural stability to the seal and acts to maintain the engagement of the brace with the at least one body. This arrangement can also aid in reducing twisting of the brace and/or at least one body in the event of disengagement of the lip from the feature.

The lip may comprise a wedge tapering to an edge at the lip extremity.

The lip may comprise at least one inward step in a radial direction of the disc.

The at least one inward step may form at least one ledge on the lip.

The lip may comprise a plurality of inward steps in a radial direction of the disc forming a plurality of ledges. The inward steps and ledges act to return the brace to an equilibrium or centred position. The ledges also provide a small force to resist movement of the blades and contribute a minor dampening of vibrations of the blades and annulus filler. There is some beneficial aerodynamic performance of this seal configuration due to the centrifugal force acting on the lip.

The lip may protrude from the brace towards the respective blade.

The lip may protrude from the at least one body towards the respective blade.

The lip may protrude in a substantially circumferential direction of the disc.

The radially inner opposing wall may have a first captive ridge.

The radially outer opposing wall may have a second captive ridge.

The lip may comprise a bulbous curve at the radially inner extremity of the lip. The captive ridges and bulbous curve aid in retaining the lip within the slot in the event of blade movement.

The lip may comprise at least one knuckle at the extremity of the lip.

The at least one ledge may comprise a fabric section.

The brace may be mounted to the disc.

The brace may have a retention feature and be mounted to the disc by way of complementary retention feature defined by the disc and located between the respective pair of adjacent blades. Retaining the brace to the disc can reduce the likelihood of the at least one body being released from the blade under condition of extreme blade movement.

The retention feature and the complementary retention feature may be of dovetail cross-sectional shape.

The retention feature and the complementary retention feature may be of substantially circular cross-sectional shape.

According to an aspect of the invention there is provided a rotor assembly for a gas turbine engine according to claim 21.

Embodiments of the invention will now be described by way of example with reference to the accompanying drawings in which.

Figure 1:
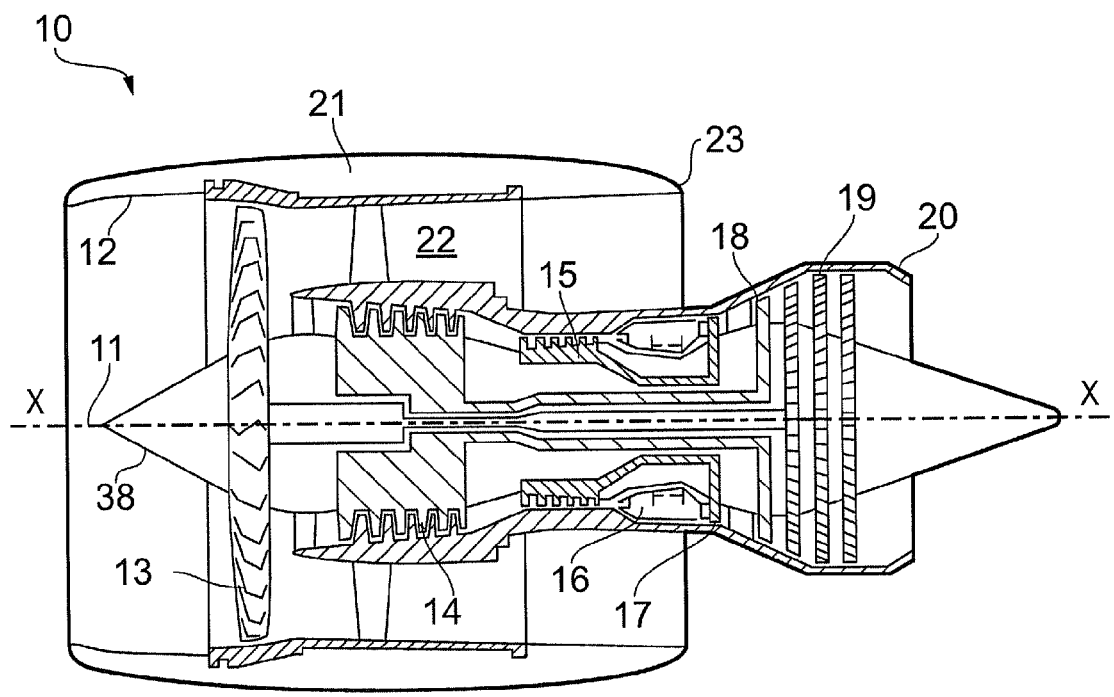
FIG. 1 is a longitudinal section of a ducted fan gas turbine engine incorporating an embodiment of the present invention.

With reference to FIG. 1, a ducted fan gas turbine engine is generally indicated at 10 is shown in longitudinal section and has a principle and rotational axis 11. The gas turbine engine 10 includes, in axial flow series, an air intake 12, a propulsive fan 13, an intermediate pressure compressor 14, a high pressure compressor 15, a combustor 16, a high pressure turbine 17, an intermediate pressure turbine 18, a low pressure turbine 19 and a core engine exhaust nozzle 20. A nacelle 21 surrounds the engine 10 and defines a bypass duct 22, the bypass exhaust 23 and the intake 12. A nose cone 38 defines an aerodynamic inner annulus in front of the fan 13.

Operating in the conventional manner, air is draw into the intake 12 of the gas turbine engine 10 and is accelerated through the fan 13 and divided into two separate flows. A first flow, which may be a significant portion, is forced through the bypass duct 22 and discharged from the bypass exhaust 23 contributing to the overall propulsive thrust generated by the engine 10. A second flow enters the intermediate pressure compressor 14 where the air is compressed before being delivered into the high pressure compressor 15 compressing the air still further.

Air exiting the high pressure compressor 15 enters the combustor 16 where fuel is added and the resulting mixture combusted to form a high temperature working fluid, which is expelled into the high pressure turbine 17. The passage of the working fluid imparts work to, and causes the rotation of, the high pressure turbine 17 and so drives the high pressure compressor 15 via a suitable shaft (not referenced). The working fluid, reduced in pressure and temperature, is expanded into two further turbine stages: the intermediate pressure turbine 18 and the low pressure turbine 19, which are drivingly connected to the intermediate pressure compressor 14 and the fan 13 respectively via shafts (not referenced). The working fluid exits the low pressure turbine 19 and is ultimately expelled from the core engine exhaust nozzle 20 contributing to engine propulsive thrust.

Figure 2:
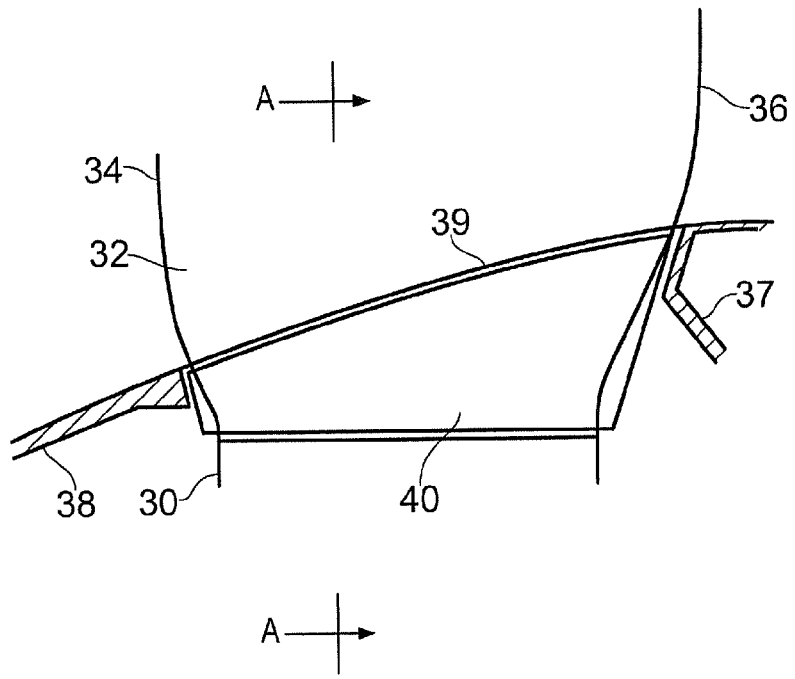
FIG. 2 is a partial view of a radial section through a part of a fan stage rotor assembly showing the arrangement of a blade and annulus filler in accordance with the present invention.

Referring now to FIG. 2, conventionally the propulsive fan 13 is an assembly comprising a rotor disc 30 and an annular array of radially extending blades 32 (shown in part). It is known to mount the blades 32 to the disc 30 via dovetail joints (which are not shown in FIG. 2). Each blade 32 includes an aerofoil having pressure 32$p$ and suction surfaces 32$s$ (illustrated in cross-section A-A as shown in FIG. 3) that extend in an axial direction between a leading edge 34 and a trailing edge 36; the aerofoil also extending radially between a dovetail root and a tip (not referenced) of the blade 32.

An annulus filler 40 has an aerodynamic airwash surface 39 which spans a radially inner annulus of a passage defined between adjacent blades 32. The blades 32 are arcuate between their leading and trailing edges 34, 36. This arcuate structure, combined with an increasing radial height of the airwash surface 39 between the leading and trailing edges 34, 36 means the annulus filler 40 must match the blade 32 shape to form the airwash surface 39. There is a disparity between the airwash surface 39 shape and the shape of the dovetail joints used to mount the annulus filler 40 which can lead to difficulties during assembly. Use of the annulus filler 40 on the fan 13 increases the weight of the engine 10 which may have a negative effect on engine efficiency. Conversely, the benefits of improved aerodynamic flow of air entering the engine, resistance to bird strike and the presentation of a smooth surface mean annulus filler 40 use is beneficial.

The nose cone 38 is assembled as a part of the fan 13 and in combination with a rear seal ring 37 may be used to retain the annulus filler 40 in position.

Figure 3:
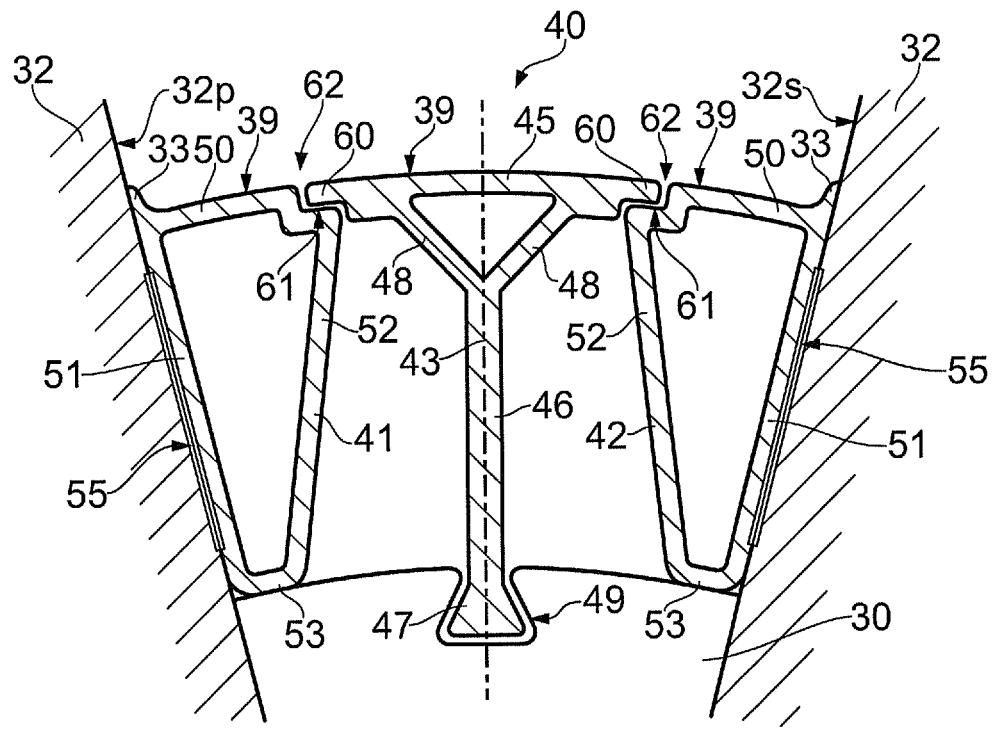
FIG. 3 is a cross-section A-A, from FIG. 2, through the annulus filler of the present invention.

An embodiment of the invention, the annulus filler 40 shown in cross-section in FIG. 3, is assembled from three OMC (Organic Matrix Compound) components: two bodies in the form of box-sections 41, 42 and a brace 43. The brace 43 is arranged centrally of the box-sections 41, 42 and has a lid 45 connected by a strut 46 to a retention feature 47. The retention feature 47 engages with the rotor disc 30 by way of a complementary retention feature 49 when the annulus filler 40 is assembled. The retention feature 47 and the associated complementary retention feature 49 are shown in the form of dovetail cross-sectional shape, although other cross-sectional shapes may be used. A dovetail cross-sectional shape is particularly useful where the material (Organic Matrix Composite) of the annulus filler 40 is susceptible to crushing.

The retention feature 47 and the associated complementary retention feature 49 extend in a substantially straight axial direction of the rotor disc 30 in this example. This has the benefit of allowing a difference of curvature between the brace 43 and the blade 32 and ensures mounting the brace 43 to the rotor disc 30 is simple, visible and repeatable. However, there may be some benefit in having the retention feature 47 and the associated complementary retention feature 49 extend in a curved axial direction.

The box-sections 41, 42 have a radially outer wall 50, two generally radially extending side walls 51, 52 and a radially inner wall 53. The side wall 51 is attached to the respective blade 32 and generally follows the respective pressure 32p or suction surface 32s profile. The side wall 52 tapers towards the side wall 51 to meet the inner wall 53 which is relatively short in this embodiment of the invention. It may be preferable in this embodiment to exclude the inner wall 53 altogether, allowing the side walls 51, 52 to meet at a point. The radially outer wall 50 of each of the box-sections 41, 42 engage with the lid 45 of the brace 43 to form the airwash surface 39 of the annulus filler 40.

Additionally, a trim 33 which is integral to the box-sections 41, 42 provides a smooth aerodynamic transition between the airwash surface 39 defined by the box-sections 41, 42 and the respective blade 32. It is conceivable that the trim 33 could be integral to the blades 32 and act as a locating and additional retention feature to contain the box-sections 41, 42. Potentially, the trim 33 may be excluded from the embodiment entirely where beneficial to do so.

Organic Matrix Composite (OMC), which is a generic term, is more specifically a polymer matrix carbon fibre reenforced composite as used in this embodiment. This material is particularly useful in this application; however, other composites, plastics or metals may be used to manufacture the components. The OMC can be manufactured to be particularly frangible in certain regions of the component, i.e., encouraged to break-up in specific regions in the event of being subjected to a destructive force. In general, the OMC components may be manufactured with variable wall thicknesses or even holes, dependent upon the specific stiffness requirements at certain points in the component. Holes in components may be used to reduce the mass of the annulus filler 40.

The box-sections 41, 42 in the embodiment are hollow and therefore able to flex and allow for movement of the blades 32. It may be found to be necessary however, to stiffen the box-sections 41, 42 in order to transfer load to the blades 32 and improve adhesion. This may be achieved by filling box-sections 41, 42 with a polymathacrylimide (PMI) based closed-cell rigid foam, for example Rohacell®, or a similar lightweight core material. Alternatively, an internal stiffing structure may be provided, and preferably manufactured integrally, within the box-sections 41, 42 (see FIG. 5 for illustration). Additionally, the box-sections 41, 42 may have closed ends in the upstream and downstream directions to improve stiffness, but alternatively may be left open-ended.

The box-sections 41, 42 may be attached to their respective blades 32 by using a fastening able to withstand strong shear loads. Use of an industrial grade of a 'hook and loop' fixture 55, for example Velcro®, would meet the requirements. The 'hook and loop' fixture 55 consists of two co-operating layers, one comprising a plurality of hooks, the other a fabric-like material having loops capable of becoming entangled with the hooks and thereby fastening the layers together. Other interlocking forms may be used, for example: fixtures having a visual appearance of bobbles interlocking with clinch holes; or, strips having interlocking 'mushroom heads' that can be snapped together such as is found with a 3M™ Dual Lock™ fastener. The layers of the 'hook and loop' fixture 55 may be co-moulded with blades 32 and box-sections 41, 42 respectively at manufacture, before assembly; alternatively, the layers may be attached by way of an adhesive on, or embedded within, the layers. The 'hook and loop' fixtures 55 and thereby the respective box-sections 41, 42 are held in place under compression and shear rather than being subject to tension and peel forces.

It is an advantage of assembling the box-sections 41, 42 in this manner, that they may be removed from the blades 32 without damage to either component. For example, the blade 32 may be removed from the rotor disc 30 because of the need for maintenance or replacement of the blade 32.

The lid 45 has a lip 60 which engages and overlaps with a co-operating feature 61 defined by the respective box-section 41, 42. The lip 60 protrudes from the lid 45 in a generally circumferential direction of the rotor disc 30 towards the blade 32. The engagement of the lip 60 and the co-operating feature 61 forms a seal 62 between the lid 45 and the radially outer wall 50 of the box-section 41, 42 so as to form the continuous airwash surface 39.

The unlinked nature of the engaging lip 60 and co-operating feature 61 allow the seal 62 to be flexible and able to absorb a degree of relative movement, in a circumferential direction of the rotor disc 30, between adjacent blades 32 without damage to the annulus filler 40. In addition to allowing the annulus filler 40 to be flexible, the lip 60 and co-operating feature 61 seal 62 arrangement should provide a better outcome in case of extreme blade 32 movement, such as a 'blade-off' event. During an extreme event the three OMC components working in concert through the seal 62 arrangement is designed reduce the amount of debris, resulting from annulus filler 40 fragments, passing downstream through the remainder of the engine 10.

In the event of a 'whole' blade 32 being released the 'hook and loop' fixture 55 will allow the box-section 41, 42 to shear apart from the blade 32. This will reduce the mass of the blade 32 impacting elsewhere in the engine 10. Additionally, should the three OMC components be released as a whole during an event, the design allows a break up into smaller fragments on impact with the adjacent blade 32 or on impact with the bypass duct 22.

The first embodiment as shown in FIG. 3 has lips 60 which overlap the respective recesses 61 in a direction radially outward of the rotor disc 30. Functionally, in addition to forming the seal 62 between the segments of the annulus filler 40, arranging the lips 60 and respective recesses 61 in this manner allows the retention, by the brace 43, of the box-sections 41, 42 against the blades 32. The need for the brace 43 to be flexible as a result of the lip 60 and co-operating feature 61 design, yet remain stiff enough to transfer loads to other components, may necessitate addition supports 48 on the brace 43. This additional stiffening of the lid 45 may, or may not, be required on all embodiments of the invention.

Figure 4:
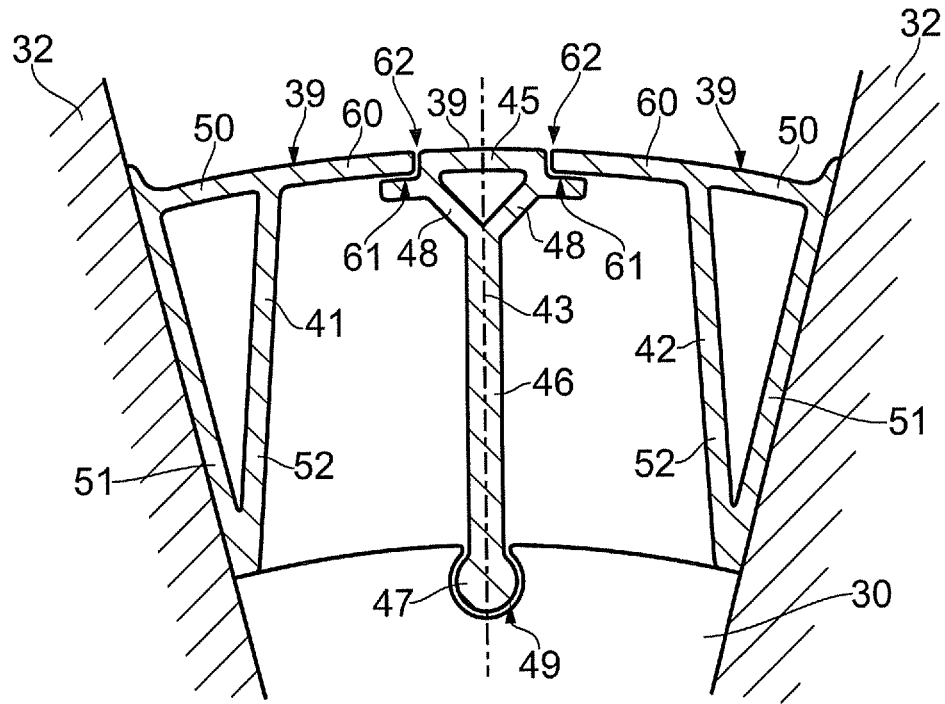
FIG. 4 is a cross-section A-A, from FIG. 2, through a second embodiment of the annulus filler of the present invention.

In FIG. 4 a second embodiment of the annulus filler 40 is shown having the two OMC box-sections 41, 42 and the OMC brace 43. In this arrangement the features making up the brace 43 are reduced in size and the structural strength of the annulus filler is provided by the box-sections 41, 42. There is an expectation that a reduced load is required to be borne by the engaging features; therefore, the retention feature 47 and complementary retention feature 49 of the brace 43 can be reduced to a substantially circular cross-sectional shape. The lid 45 and the supports 48 have also been reduced in size in comparison with the first embodiment described above. The inner wall 53 on the box-sections 41, 42, as described above with respect to the first embodiment, is not present in this arrangement and the side walls 51, 52 meet at a point. However, there is no reason this embodiment may not have the inner wall 53 for structural design reasons. The seal 62 in this arrangement, in contrast to the first embodiment, is formed by providing the lip 60 as a protrusion in a generally circumferential direction from the box-section 41, 42 towards the respective blade 32. The co-operating feature 61, which is the complementary feature of the seal 62, is provided on the brace 43 and, as with the first embodiment described with respect to FIG. 3, completes the airwash surface 39.

The lip 60 and the co-operating feature 61 of the second embodiment allow the seal 62 to be flexible to accommodate movement of the blade 32. The lip 60 overlaps the co-operating feature 61 in a direction radially outward of the rotor disc 30. In this instance however, the lip 60 is relatively large in comparison to the co-operating feature 61 and lid 45 of the brace 43. In the event of blade 32 movement, the annulus filler 40 in this second embodiment avoids crush and damage by way of the relatively large lip 60 riding over the lid 45, in a direction radially outward of the rotor disc 30. The box-section 41, 42 will have to flex in order to transmit this motion from the blade 32. The reduced size and mass of features making up the brace 43 will potentially reduce fragment size of any debris in the event of large scale damage to the blade 32 and annulus filler 40.

Figure 5:
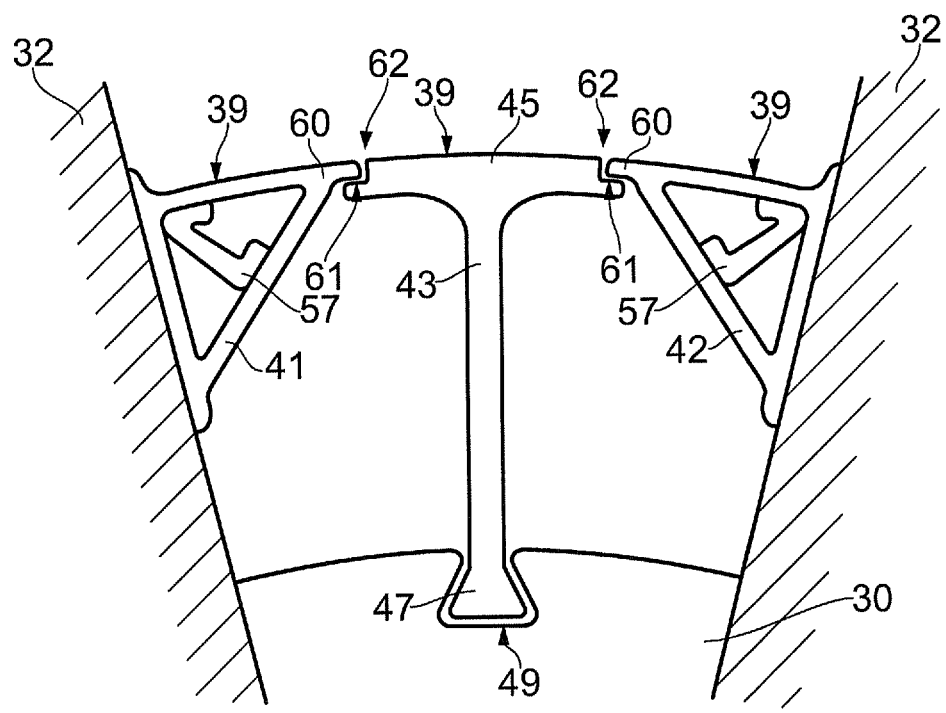
FIG. 5 is a cross-section A-A, from FIG. 2, through a third embodiment of the annulus filler of the present invention.

Referring now to FIG. 5 which is a third embodiment of the invention in which the box-sections 41, 42 have been reduced in size as far as practicable. An internal truss 57 is included to stiffen the box-sections 41, 42. The internal truss 57 may optionally be included in other embodiments of the invention where necessary in order to stiffen the box-sections 41, 42. In this instance the lip 60 and respective co-operating feature 61 have been made smaller and function in the same manner as the second embodiment described with respect to FIG. 4. Any flexing required due to blade 32 movement can absorbed by bending of the lid 45, the box-sections 41, 42, or the OMC components 41,42,43 working together. This arrangement may be particularly beneficial in instances where the blades 32 have been designed with a high degree of stiffness. A higher degree of stiffness of the blade 32 will reduce the amount of relative movement the seal 62 must tolerate.

Figure 6:
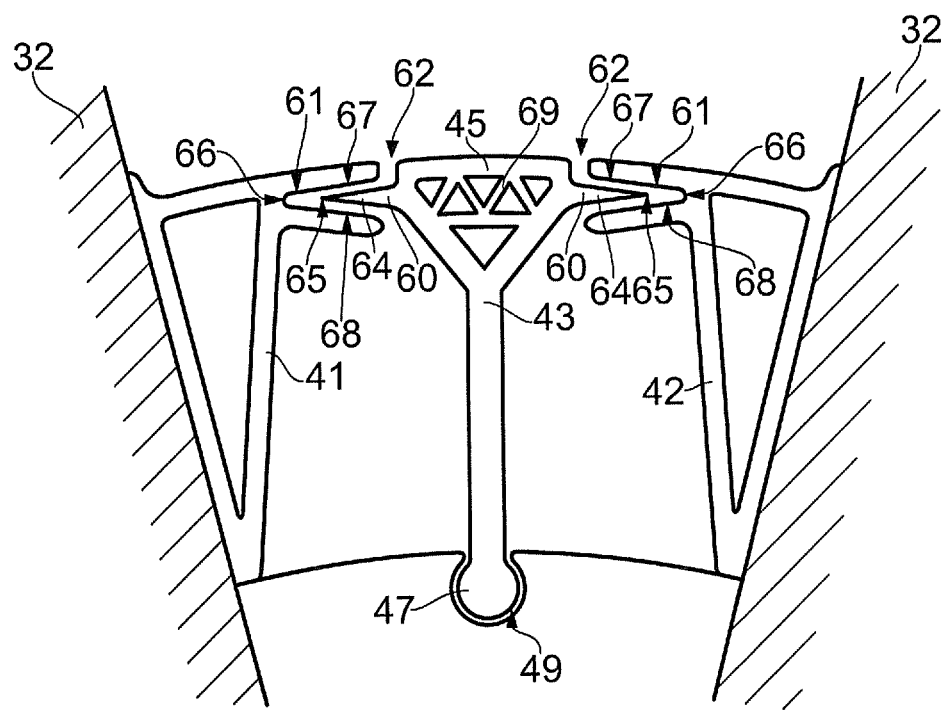
FIG. 6 is a cross-section A-A, from FIG. 2, through a fourth embodiment of the annulus filler of the present invention.

Referring now to FIG. 6 wherein a fourth embodiment of the annulus filler 40 includes the box-sections 41, 42 and the brace 43 forming together the airwash surface 39. The box-sections 41, 42 are shown without the inner wall 53 or internal truss 57, but these may be added to this embodiment should extra stiffness be required from the box-sections 41, 42. In common with the embodiments described above the annulus filler 40 includes: the seal 62, formed by the lip 60 and protruding from the lid 45 in a generally circumferentially direction towards the blade 32; and, the co-operating feature 61 defined by the box-section 41, 42. The lid in this embodiment also includes a lattice 69 internal support structure. The lattice 69 is one possible arrangement for providing a lightweight, yet structurally sound, lid 45. The details of the seals 62 and the lattice 69 have been enlarged for clarity in FIG. 6 and may be relatively smaller in comparison to the box-sections 41, 42 than illustrated.

In this instance the lip 60 takes the cross-sectional shape of a wedge 64, tapering from the root of the lip 60 where it joins the lid 45 and terminating in an edge 65. This cross-sectional shape of the lip 60 is similar to that found on a common knife. It is not necessary for this edge 65 to be a sharp point, it is likely to be just as suitable for design purposes to terminate the lip 60 with a fillet radius. The thickness of the lip 60 is chosen to give the stiffness required, in this case reducing stiffness towards the edge 65 or tip of the wedge 64.

The co-operating feature 61 of this embodiment is arranged as a bird mouth shaped slot 66 having radially outer 67 and inner opposing walls 68. The opposing walls 67, 68 are intended to contain movement of the lip 60 in the radial direction of the rotor disc 30 while allowing relative movement between the brace 43 and the box-section 41, 42 in the circumferential direction. FIG. 6 illustrates the wedge 64 and slot 66 having substantially straight edges in cross-section. In an alternative arrangement, the wedge 64 may comprise a generally curved cross-sectional shape. The curvature may be approximately centred on the retention feature 47. The bird mouth slot 66 can be provided with a corresponding curved cross-sectional shape to match and cooperate with that of the wedge 64.

The example shown in FIG. 6 and described above the seal 62 is arranged so that the lip 60 is protruding from the lid 45 and co-operating with the co-operating feature 61 defined by the box-section 41, 42; alternatively, it may be found to be beneficial to form the seal 62 with the lip 60 feature protruding from the box-section 41, 42 and co-operating with the co-operating feature 61 being defined by the lid 45 of the brace 43. This arrangement has not been illustrated by way of drawing.

The lid 45, and thereby the brace 43, are stiffened by the co-operating feature 61 taking the form of the slot 66. This stiffness is beneficial in reducing the possibility of the lid 45 twisting in the event that blade 32 movement causes the lip 60 to ride over the lid 45 (in a direction radially outward of the rotor disc 30). The additional stiffness may also be generally beneficial in retaining the structural integrity of the seal 62 and therefore the annulus filler 40 when accommodating relatively smaller movements of the blade 32 which do not result in the lip 60 riding over the lid 45.

Figure 7:
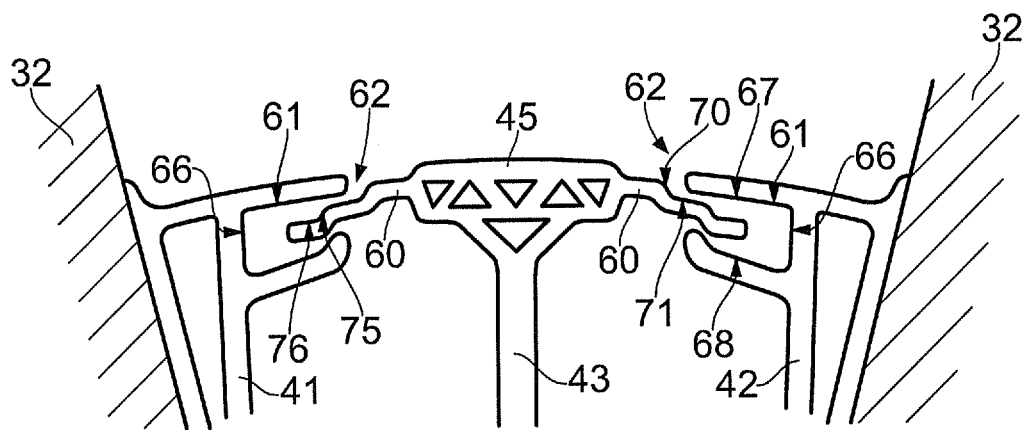
FIG. 7 is a cross-section A-A, from FIG. 2, through a fifth embodiment of the annulus filler of the present invention.

Referring now to FIG. 7 which shows a fifth embodiment of the annulus filler 40 having the lip 60 and the bird mouth shaped slot 66 forming the co-operating feature 61. FIG. 7 shows the box-sections 41, 42 being relatively smaller in comparison to the fourth embodiment of the annulus filler 40 depicted in FIG. 6 and described above; however, it may be beneficial for this embodiment to include the larger and stiffer box-sections 41, 42. In this embodiment the lip 60 comprises, along the length of the lip 60 protrusion, at least one inward step 70 forming at least one ledge 71, in a direction radially inward of the rotor disc 30. As with the embodiments described above, the lip 60 protrudes in a generally circumferential direction towards the respective blade 32.

Figure 7A:
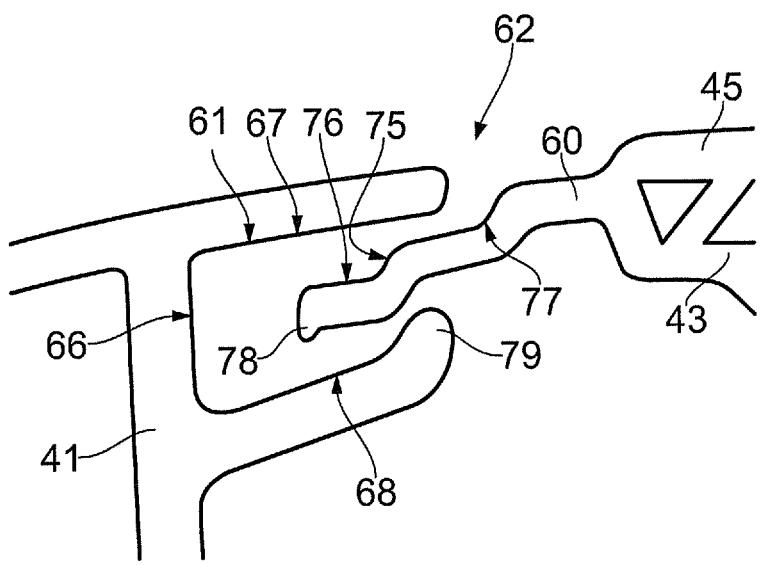
FIG. 7A is a detail view of a part of the cross-section A-A, from FIG. 2, through the fifth embodiment of the annulus filler of the present invention.

Providing the inward step 70 and ledge 71 may be sufficiently effective for some applications of annulus filler 70. However, it has been found to be beneficial to provide a plurality of inward steps 75 thereby forming a plurality of ledges 76. In this arrangement, as the lip 60 protrudes circumferentially towards the respective blade 32, each of the ledges 76 is progressively radially inward, in a direction of the rotor disc 30, of the ledge 76 preceding it, up to the extremity of the lip 60. This gives the effect of forming a terrace or staircase of the ledges 76. FIG. 7A shows the inward steps 75 and ledges 76 in detail as well as some additional features which are described below.

The co-operating feature 61 in the cross-sectional form of the slot 66 will need to have a suitable cross-sectional shape to work in concert with the lip 60 and the associated inward step 75 and ledge 76 features.

In addition to the benefit of preventing twisting of the co-operating feature 61 and lid 45, as with the wedge 64 and slot 66 arrangement of the fourth embodiment, there are several additional benefits provided by features of the embodiment described above. The inward steps 75 and ledges 76 help to ensure the brace 43 remains centred between the two box-sections 41, 42 as a result of the resilient nature of the lip 60. This resilient nature produces a small force acting against the box-section 41, 42 to return the brace 43 to equilibrium should the lip 60 become out of position with respect to the box-section 41, 42. This could be termed 'a centring force' acting on the brace 43. This resilient nature of the lip 60, producing a force against the box-sections 41, 42, also gives some resistance to smaller movements of the blade 32 or of the entire annulus filler 40 assembly; for instance, the vibrations and other movements associated with normal service conditions for the engine 10. This resistance to movement contributes a minor amount of damping towards suppression of the blade vibration.

Importantly, the combination of the inward steps 75, ledges 76 and the resilient nature of the lip 60 allow better aerodynamic characteristics of the seal 62, formed between the lip 60 and the co-operating feature 61, than in the previous example which does not have the inward steps 75. Furthermore, the aerodynamic characteristics of the seal 62 are particularly improved under engine 10 operating conditions where the centrifugal force acting on the lip 60 forces it against the radially outer opposing wall 67. This is despite the unlinked nature of the seal 62 allowing the brace 43 and box-sections 41, 42 to move relative to one another.

FIG. 7A is a detail view of the lip 60 and co-operating feature 61 from the fifth embodiment showing some beneficial features. The figure shows that the inward steps 75 may not be in strictly radial direction of the rotor disc 30, but may taper away from the radial direction towards the extremity of the lip 60. An optional fillet radius 77 is shown on each transition between inward step 75 and ledge 76. These features have the benefit of smoothing and easing the sliding motion of the lip 60 relative to the co-operating feature 61.

A captive ridge 79 forms the entrance edge of the radially inner opposing wall 67 of the slot 66 which co-operates with a bulbous curve 78 located on the end of the lip 60. The captive ridge 79 and the bulbous curve 78 provide a small force resisting relative movement between the lip 60 and the co-operating feature 61 in the event that movement of the blade 32 forces the box-section 41, 42 and the brace 43 to move fully apart. Additionally, the small resisting force helps to ensure that the lips 60 on each side of the brace 43 are extended to their full protruding length before one lip 60 is forced out of the respective co-operating feature 61 under extreme relative movement between brace 43 and box-section 41, 42. Furthermore, the combination of captive ridge 79 and the bulbous curve 78 assist in re-entry of the lip 60 in to the co-operating feature 61 should this occur after an extreme movement of the blade 32 forces the brace 43 and box-section 41, 42 fully apart.

Figure 8:
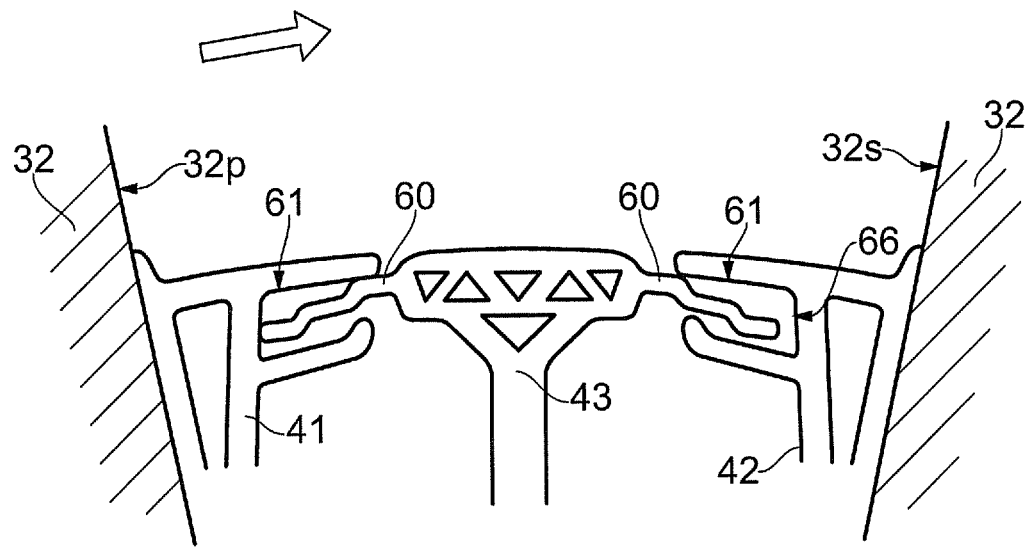
FIG. 8 is an alternate view of cross-section A-A, from FIG. 2, through the fifth embodiment of the annulus filler of the present invention.

FIG. 8 shows the fifth embodiment of the annulus filler 40 in an event where the blade 32 has been struck by an object. The pressure surface 32$p$ has moved in the extreme towards, in a circumferential direction, the suction surface 32$s$. The lip 60 closest to the pressure surface 32$p$ has moved fully within the respective co-operating feature 61. The lip 60 closest to the suction surface 32$s$ has moved partly within the respective co-operating feature 61. Thus there is still scope for the annulus filler 40 to absorb more relative movement between the box-sections 41, 42 and the brace 43 and not sustain damaged or fragment.

Figure 8A:
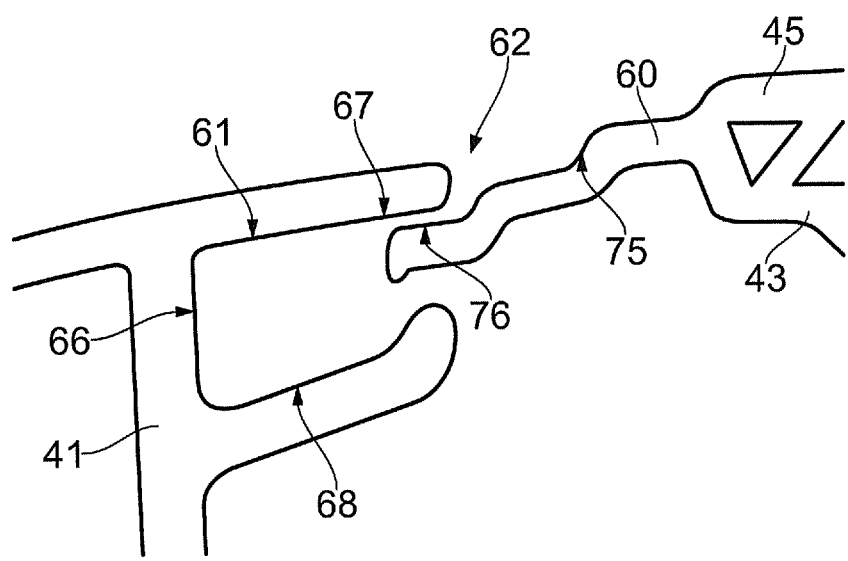
FIG. 8A is an alternate detail view of a part of the cross-section A-A, from FIG. 2, through the fifth embodiment of the annulus filler of the present invention.

FIG. 8A shows a detail view of the lip 60 and co-operating feature 61 wherein the blade 32 has been struck and moved in the opposite direction to that described with respect to FIG. 8 above. That is, the pressure surface 32$p$ has moved away from the suction surface 32$s$ in a circumferential direction of the rotor disc 30. Thus, for a given relative movement between brace 43 and box-section 41, 42, the lip 60 maintains the seal 62 as the appropriate ledge 76 on the lip 60 centrifuges against the radially outer opposing wall 67 of the slot 66 (co-operating feature 61). The centrifugal force acting on the lip 60 is a result of the spinning rotor disc 30 during engine 10 operation.

Figure 9:
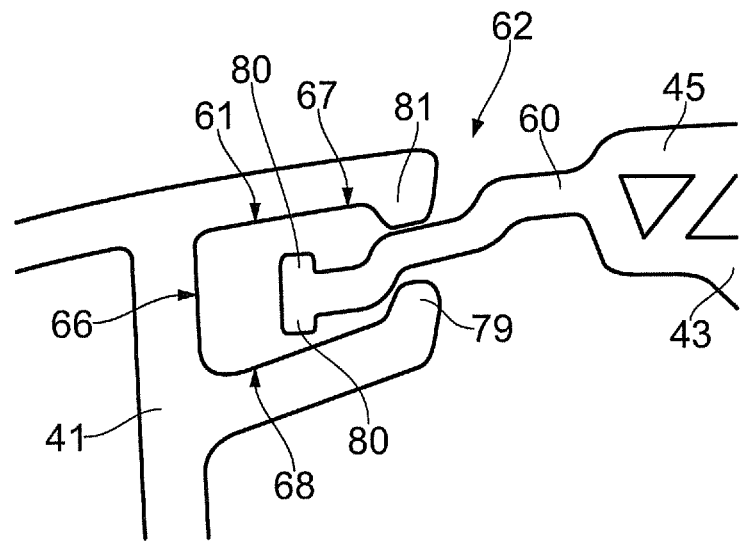
FIG. 9 is a detail view of a part of the cross-section A-A, from FIG. 2, through a sixth embodiment of the annulus filler of the present invention.

A sixth embodiment of the invention is shown in FIG. 9 which is a detail view of the lip 60 and the co-operating feature 61 of the annulus filler 40. In this arrangement the lip 60 terminates in a dog-bone cross-sectional shape with at least one knuckle 80. The captive ridge 79 is present on the entrance edge of the radially inner opposing wall 68 of the slot 66; additionally, a second captive ridge 81 is on the entrance edge of the radially outer opposing wall 67. This arrangement has been found to be beneficial in resisting the box-sections 41, 42 and the brace 43 separating under relative movement caused by the circumferential motion of the blade 32. However, under extreme conditions, such as one of the blades 32 separating from the rotor disc 30, this arrangement of the annulus filler 40 tends to cause the box-sections 41, 42 and the brace 43 to work separately from each other. Because of this, the brace 43, or fragment thereof, is more likely to be lost during a 'blade-off' event, which may mean more debris will pass through the engine 10 and increase the likelihood of damage.

Figure 10:
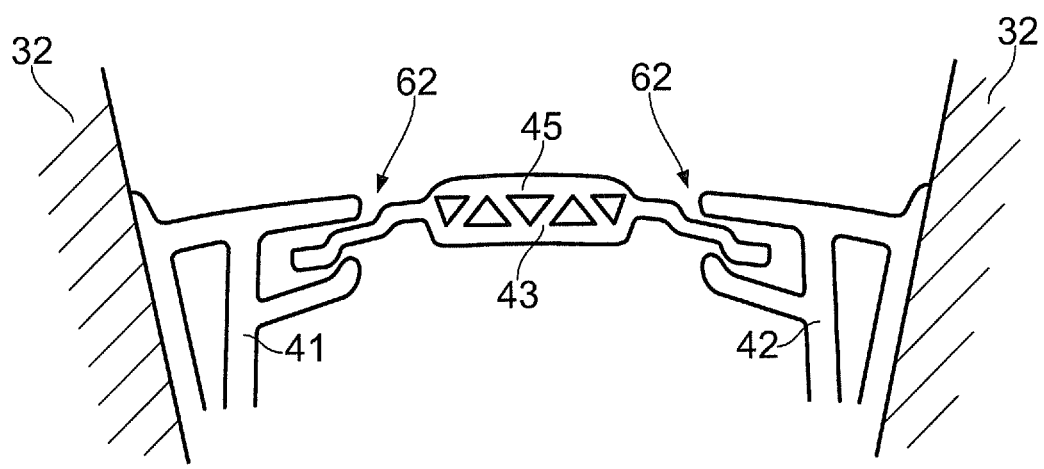
FIG. 10 is a cross-section A-A, from FIG. 2, through a seventh embodiment of the annulus filler of the present invention.

FIG. 10 shows a seventh embodiment of the annulus filler 40. The strut 46 has been removed leaving the bulk of the brace 43 body consisting of the lid 45. This will reduce the weight of the annulus filler 40 as far as practicable while retaining structural stiffness of the components. With the engagement with the rotor disc 30 by the annulus filler 40 being no longer necessary the retention feature 47 and the complementary retention feature 49 may be excluded from the embodiment. This has the advantage of reducing rotor disc 30 processing time and cost. The exclusion of the complementary retention feature 49 is a considerable benefit in regard to design for stress within the rotor disc 30.

Excluding the strut 46 and retention feature 47 from the annulus filler 40 may mean a cheaper and lighter rotor disc 30 and annulus filler 40 system.

The annulus filler 40 requires that the lid 45 support the brace 43 in the absence of being mounted to the rotor disc 30 via the retention feature 47. Supporting the brace 43 in this manner will mean additional relative movement between the brace 43 and the box-section 41, 42, particularly when the engine 10 is accelerating or decelerating to operational rotational velocity. This may be particularly problematic where acceleration or deceleration are of large magnitude and may lead to rapid wear of the components of the annulus filler 40. The arrangement increases the likelihood that the brace 43 will be released as debris in the event of damage to the box-section 41, 42.

Figure 10A:
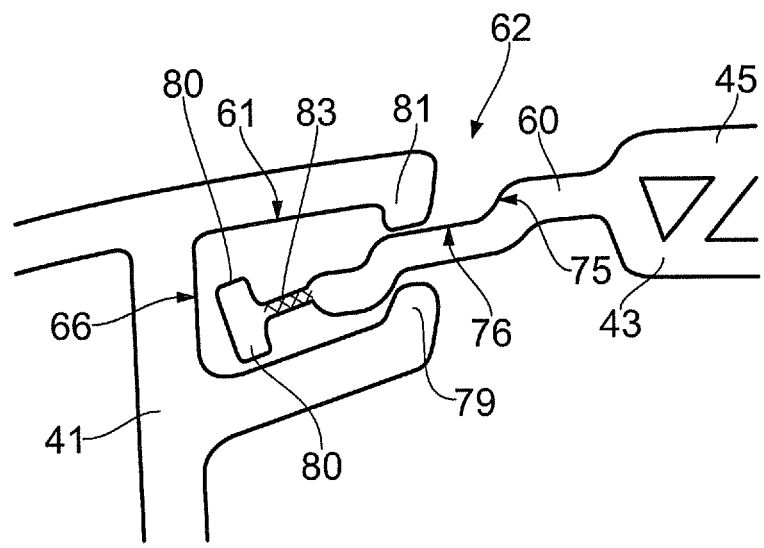
FIG. 10A is a detail view of a part of the cross-section A-A, from FIG. 2, through the seventh embodiment of the annulus filler of the present invention.

The knuckle 80 features described with respect to FIG. 9 may also be utilised to retain and prevent disengagement of the brace 43 and lid 45 in the event of extreme blade 32 movements. This is shown in FIG. 10A. The lip 60 in this arrangement may be flexible and constructed in part purely from a fabric section 83. The fabric section 83 may comprise fibres that are one of constituent materials making up the OMC, the matrix supporting the fibres having been excluded from the fabric section 83 so that it remains flexible. Conceivably, the fabric section 83 may be manufactured from an elastomer polymer, rubber or other flexible material. During normal operation the inward steps 75 and ledges 76 restrain radial movement; however, in the event of extreme blade 32 movement the 'dog bone' knuckle 80 will retain the brace 43 when the fabric section 83 of the lip 60 is at maximum extension.

Figure 11A:
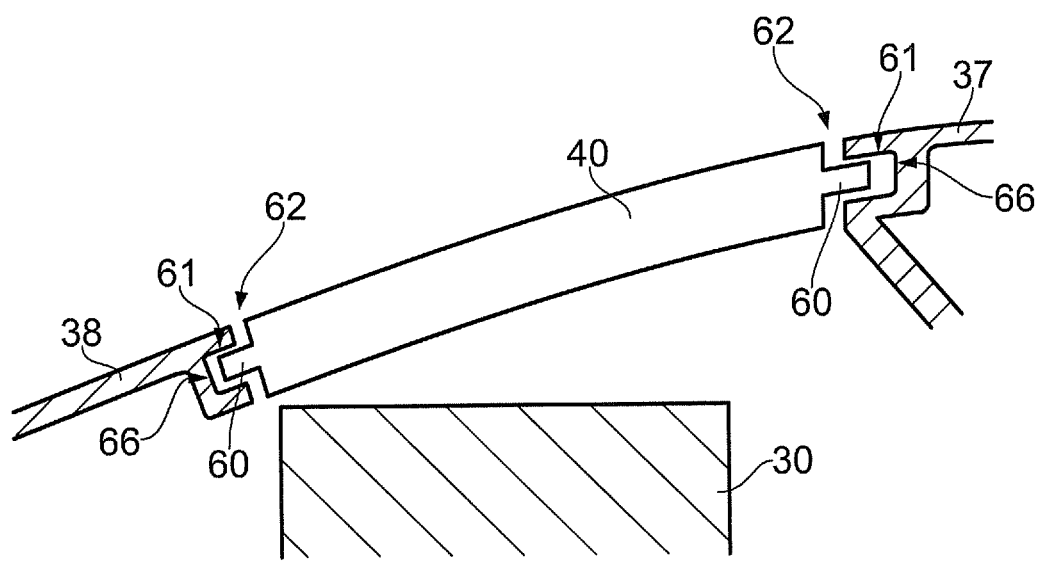
FIG. 11A is a partial view of a radial section through a part of a fan stage rotor assembly showing an arrangement of the annulus filler in accordance with the present invention.

The exclusion of the retention feature 47 may require additional support for the annulus filler 40 which may be provided by the axial retaining features. The axial retaining features being the rear seal ring 37 and a nose cone 38 in this example. The seal 62 features of the lip 60 and co-operating feature 61 may be employed such that the annulus filler 40 engages with the rear seal ring 37 and nose cone 38 to provide the extra support. This detail is shown in FIG. 11A where the rear seal ring 37 and nose cone 38 are both shown having the co-operating feature 61 in the shape of the slot 66 engaging with the lip 60 on the annulus filler 40. The lip 60 may or may not include the inward step 70 and respective ledge 71 (not shown in FIG. 11A). Depending on blade 32 chord length, axial stiffening of the annulus filler 40 may be required.

This arrangement is more suited to propeller cowl and blade filler, where typically curved sections fore and aft can be used not just to aid retention but also to aid positioning.

Figure 11B:
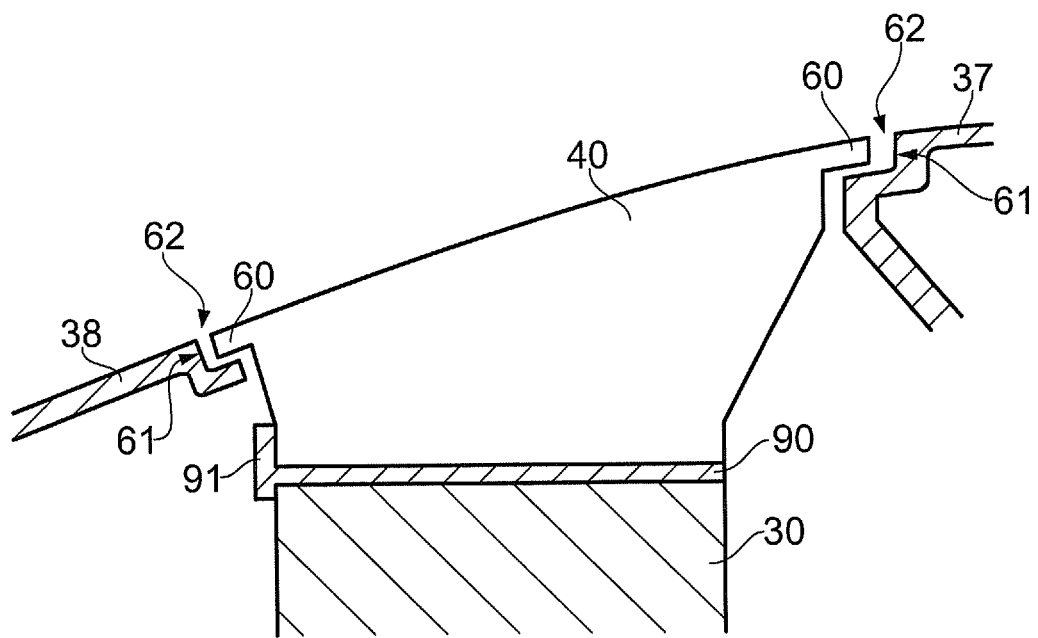
FIG. 11B is a partial view of a radial section through a part of a fan stage rotor assembly showing another arrangement of the annulus filler in accordance with the present invention.
Figure 11C:
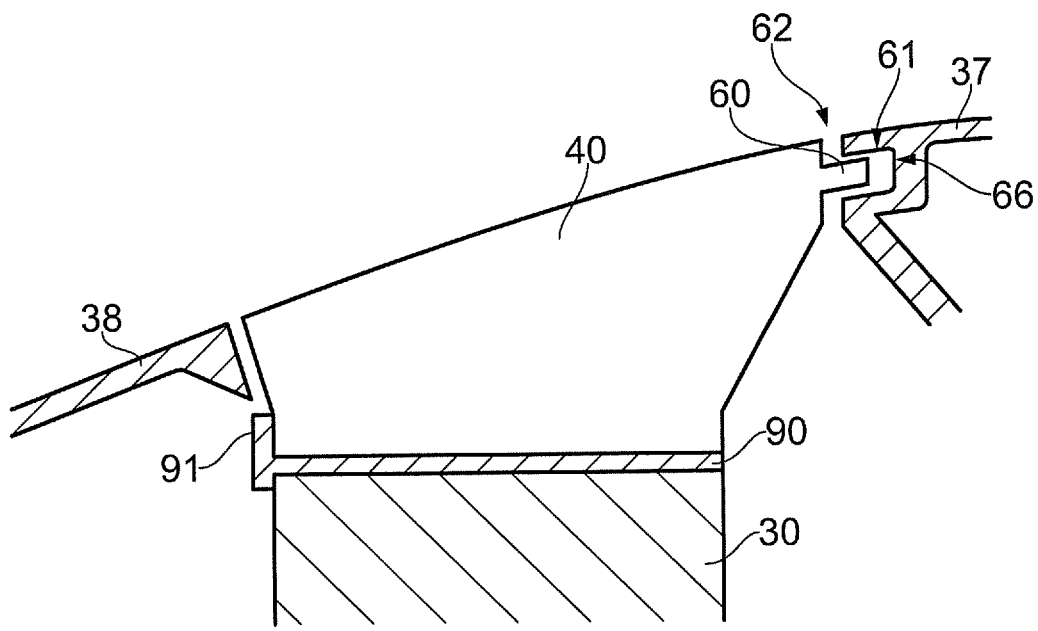
FIG. 11C is a partial view of a radial section through a part of a fan stage rotor assembly showing another arrangement of the annulus filler in accordance with the present invention.

FIGS. 11A, 11B and 11C show examples of the annulus filler 40 in radial section through a part of a fan stage rotor assembly in the same manner as FIG. 2. FIG. 11B shows the annulus filler 40 within a ducted fan arrangement wherein the seal 62 provided on the axial retaining features is of a similar structure to that of the first embodiment (described with respect to FIG. 3). In this case the lips 60 protruding in an axial direction from the annulus filler 40, in both upstream and downstream directions, overlap the respective recess in a direction radially outward of the rotor disc 30. An example of axial retention of the annulus filler 40 is shown in FIG. 11C wherein the nose cone 38 is shown with no seal 62 feature, the annulus filler 40 and the nose cone 38 merely abut each other. The rear seal ring 37 has the co-operating feature 61 of the slot 66 type overlapping the lip 60 protruding from the annulus filler in a manner similar to that described with respect to FIG. 11A.

While the annulus filler 40 in FIG. 11A does not have the strut 46 and associated retention feature 47, FIGS. 11B and 11C show the annulus filler 40 where these features are present. Two additional features are also shown in FIGS. 11B and 11C: a sleeve 90 and stop lug 91. The sleeve 90 acts to provide corrosion resistance and galvanic isolation to the rotor disc 30 and fits over the retention feature 47. The stop lug 91, which is optional, is used to positively locate the annulus filler 40 in the axial direction during mounting to the rotor disc 30. The stop lug 91 also gives positive feedback during installation that the annulus filler 40 has been correctly assembled.

It will be appreciated that, in the event that the blades 32 are constructed from a composite material, then potentially the box-sections 41, 42 may be co-moulded with the blades 32 or joined by an adhesive during blade 32 manufacture in any of the above described embodiments.

Where it is appropriate to consider co-moulding the box-sections 41, 42 with the blades 32, then the box-sections 41, 43 remain individual components i.e. not a part of the blade 32 itself but joined to the blade 32. In this case of joining by co-moulding the join between the blade 32 and the box section 41, 42 may be achieved by the resin used in the co-moulding process. Put another way, the co-moulding of the box-sections 41, 42 with the blades 32 may be considered a co-curing process. In such a co-moulding process the box-sections 41, 42 may pre-formed to almost their final shape and inserted in to a mould with the blade 32. The blade 32 may be pre-formed such that it is very close to its final shape. Essentially the co-moulding process may be thought of as a final assembly process which includes the box-sections 41, 42. The heat and pressure and then curing of the co-moulding process may form the final surface finish of the blade 32 from the cured resin so as to form a set of air/gas washed surfaces. The heat and pressure cause the resin to join the box-sections 41, 42 to the blade 32.

Additionally, a layer may be inserted between the box sections 41, 42 and the blade 32. Pins and/or fibres may be inserted into the layer such that the pins and/or fibres become embedded in the box sections 41, 42 and blade 32 during the co-moulding/co-curing process. The presence of the pins may increase the resistance to the shear forces acting on the join between the blade 32 and the box-sections 41, 42. In order for the pins to become embedded in the box-sections 41, 42 the box sections 41, 42 may be required to be not fully cured from their own manufacturing process prior to being inserted into the mould. The box-sections 41, 42 may be filled with a rigid foam so that they do not collapse or distort under the pressure of the co-moulding/co-curing process.

Alternatively, another suitable bonding may be used to join the box-sections 41, 42 to the blade 32 in place of the industrial 'hook and loop' fixture 55 described above. Such a bond must be able to withstand the shear loads to which the join will be subjected to during operation of the gas turbine engine 10.

It will be appreciated that where technical features have been described with an embodiment they may also be combined or replaced with features from other embodiments where this is applicable.

What is claimed is:

1. A rotor assembly for a gas turbine engine, the rotor assembly comprising:
    a disc supporting a plurality of radially extending blades,
    the blades defining passages between their circumferentially-facing surfaces and each of these passages having an annulus filler assembly; and
    the annulus filler assembly comprising at least two bodies and a brace,
    each of the bodies being mounted to one of adjacent said blades and the brace occupying a position centrally of the at least two bodies, each of the bodies and the brace interacting with one another to form an airwash surface, the interaction of the brace with at least one said body forming a floating and moveable seal, the seal having a lip arranged to overlap a co-operating feature, and the feature having a radially outer opposing wall and a radially inner opposing wall to define a slot by way of a radial gap between the opposing walls and the lip being located centrally therebetween so as to be within the slot and movable relative to the opposing walls.

2. A rotor assembly for a gas turbine engine as claimed in claim 1, wherein the brace is mounted to the disc.

3. A rotor assembly for a gas turbine engine as claimed in claim 1, wherein the lip comprises at least one inward step in a radial direction of the disc and the at least one inward step forms at least one ledge on the lip.

4. A rotor assembly for a gas turbine engine as claimed in claim 1, wherein the radially inner opposing wall has a first captive ridge and the lip comprises a bulbous curve at the radially inner extremity of the lip.

5. A rotor assembly for a gas turbine engine, the rotor assembly comprising:

a disc supporting a plurality of radially extending blades, the blades defining passages between their circumferentially-facing surfaces and each of these passages having an annulus filler assembly; and the annulus filler assembly comprising at least two bodies, each of which comprises a hollow box-section constituted by walls surrounding an interior opening, and a brace, each of the bodies being mounted to one of adjacent said blades and the brace occupying a position centrally of the at least two bodies, each of the bodies and the brace interacting with one another to form an airwash surface, the interaction of the brace with at least one said body forming a floating and moveable seal, the seal having a lip arranged to overlap a co-operating feature, and the feature having a radially outer opposing wall and a radially inner opposing wall to define a slot by way of a radial gap between the opposing walls and the lip being located centrally therebetween so as to be within the slot and movable relative to the opposing walls.

6. A rotor assembly for a gas turbine engine as claimed in claim 5, wherein the lip is a wedge tapering to an edge at the lip extremity.

7. A rotor assembly for a gas turbine engine as claimed in claim 5, wherein the lip comprises at least one inward step in a radial direction of the disc and the at least one inward step forms at least one ledge on the lip.

8. A rotor assembly for a gas turbine engine as claimed in claim 5, wherein the lip comprises a plurality of inward steps in a radial direction of the disc forming a plurality of ledges.

9. A rotor assembly for a gas turbine engine as claimed in claim 5, wherein the radially inner opposing wall has a first captive ridge.

10. A rotor assembly for a gas turbine engine as claimed in claim 5, wherein the radially outer opposing wall has a second captive ridge.

11. A rotor assembly for a gas turbine engine as claimed in claim 5, wherein the lip comprises a bulbous curve at the radially inner extremity of the lip.

12. A rotor assembly for a gas turbine engine as claimed in claim 5, wherein the lip comprises at least one knuckle at the extremity of the lip.

13. A rotor assembly for a gas turbine engine as claimed in claim 7, wherein the at least one ledge comprises a fabric section.

14. A rotor assembly for a gas turbine engine as claimed in claim 5, wherein the brace has a retention feature and is mounted to the disc by way of a complementary retention feature defined by the disc and located between the respective adjacent said blades.

15. A rotor assembly for a gas turbine engine, the rotor assembly comprising:

a disc supporting a plurality of radially extending blades, the blades defining passages between their circumferentially-facing surfaces and each of these passages having an annulus filler assembly that extends from a trailing edge to a leading edge of each of the blades defining the each passage; and the annulus filler assembly comprising at least two bodies and a brace, each of the bodies being mounted to one of adjacent said blades and the brace occupying a position centrally of the at least two bodies, each of the bodies and the brace interacting with one another to form an airwash surface, the interaction of the brace with at least one said body forming floating and moveable seal, the seal having a lip arranged to overlap a co-operating feature, the feature having a radially outer opposing wall and a radially inner opposing wall to define a slot by way of a radial gab between the opposing walls and the lip being located centrally therebetween so as to be within the slot and movable relative to the opposing walls, and the rotor assembly being a fan assembly and the blades being fan blades.

* * * * *